United States Patent
Kreger et al.

(10) Patent No.: US 7,037,005 B2
(45) Date of Patent: May 2, 2006

(54) PAN AND TILT APPARATUS USING ACHROMATIC PRISMS

(75) Inventors: James Harrison Kreger, Cincinnati, OH (US); Peter James Folberth, Cincinnati, OH (US)

(73) Assignee: Northrop Grumman Corporation, Los Angeles, CA (US)

( * ) Notice: Subject to any disclaimer, the term of this patent is extended or adjusted under 35 U.S.C. 154(b) by 133 days.

(21) Appl. No.: 10/812,259

(22) Filed: Mar. 29, 2004

(65) Prior Publication Data

US 2005/0213964 A1   Sep. 29, 2005

(51) Int. Cl.
*G03B 17/00* (2006.01)

(52) U.S. Cl. .................... 396/427; 396/544

(58) Field of Classification Search .......... 396/427, 396/544; 359/211, 831, 837
See application file for complete search history.

(56) References Cited

U.S. PATENT DOCUMENTS

| | | | |
|---|---|---|---|
| 1,647,631 A | 11/1927 | Ives | |
| 2,975,668 A | 3/1961 | Eckel | |
| 3,083,611 A | 4/1963 | Ziolkowski et al. | |
| 3,378,687 A | 4/1968 | Schepler | |
| 3,514,619 A | 5/1970 | Ireland | |
| 3,881,802 A | 5/1975 | Helava | |
| 4,118,109 A | 10/1978 | Crawford et al. | |
| 4,252,401 A | 2/1981 | Jozwiak | |
| 4,364,628 A | 12/1982 | Garner | |
| 4,453,087 A | 6/1984 | Linick | |
| 4,717,224 A | 1/1988 | Diehl et al. | |
| 4,850,686 A | 7/1989 | Morimoto et al. | |
| RE33,228 E | 6/1990 | Buchtel et al. | |
| 5,321,259 A | 6/1994 | Morgan | |
| 5,461,513 A * | 10/1995 | Maruyama | 359/837 |
| 5,625,499 A | 4/1997 | Chen | |
| 6,343,767 B1 | 2/2002 | Sparrold et al. | |
| 6,344,937 B1 | 2/2002 | Sparrold et al. | |
| 6,473,250 B1 | 10/2002 | Chapman et al. | |
| 6,747,738 B1 * | 6/2004 | Knapp | 356/326 |
| 6,935,757 B1 * | 8/2005 | Mooney et al. | 359/615 |

FOREIGN PATENT DOCUMENTS

GB   833382   4/1960

\* cited by examiner

*Primary Examiner*—W. B. Perkey
(74) *Attorney, Agent, or Firm*—Pietragallo, Bosick & Gordon LLP; Robert P. Lenart, Esq.

(57) ABSTRACT

An apparatus for providing pan and tilt capability to a stationary imaging device comprises a first achromatic prism doublet positioned on a first axis, a second achromatic prism doublet positioned on the first axis, and at least one motor for rotating the first and second achromatic prism doublets about the first axis whereby polychromatic electromagnetic radiation from a portion of an area of interest is directed toward an imaging device. A method of using the apparatus is also provided.

16 Claims, 5 Drawing Sheets

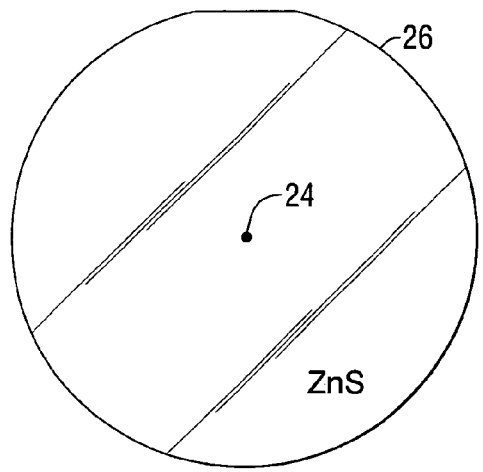
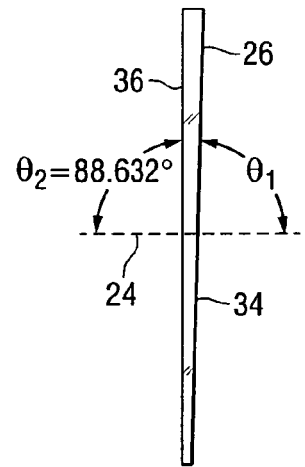
FIG. 2  FIG. 3
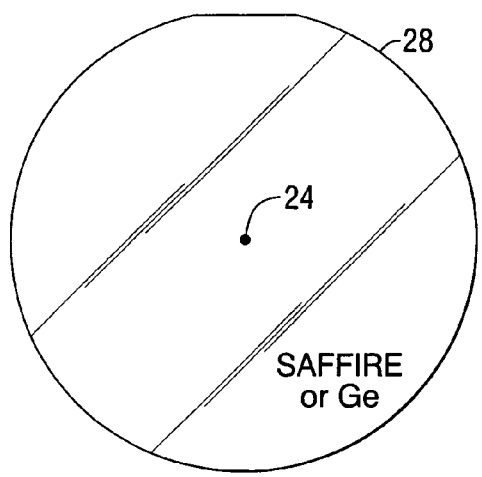
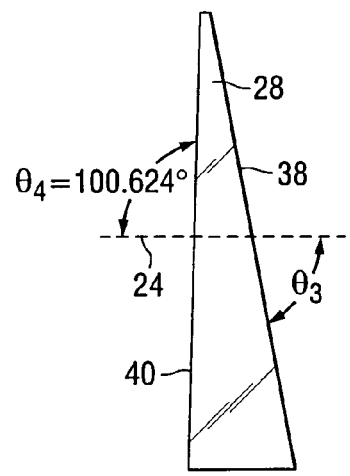
FIG. 4  FIG. 5

PAN AND TILT APPARATUS USING ACHROMATIC PRISMS

FIELD OF THE INVENTION

This invention relates to optical systems, and more particularly to optical systems that provide pan and tilt functions for imaging devices.

BACKGROUND OF THE INVENTION

Imaging systems used for monitoring an area typically include mechanical components for moving an imaging device, such as a camera, to direct the camera toward an area of interest. The mechanical components provide a pan and tilt function and can be operated manually or automatically. In some instances, it is not practical to move the camera. For those instances, it would be desirable to have a device that provides the pan and tilt function without requiring physical movement of the camera.

Prisms are known to bend light. The degree of bending is a function of the wavelength of light and thus prisms are typically used to separate the various light wavelengths allowing independent studying of each wavelength of the incident light beam. In the case of white light, comprised of all visible wavelengths (e.g. all colors), a prism can separate the white light into the seven commonly referred to colors of the rainbow.

Risley prisms, which include two counter-rotating circular thin prism wedges, have been used in the ophthalmology field to steer laser beams. Since lasers are on a single wavelength, no achromatic correction is needed.

While prisms can be used to shift the direction of light, wavelength separation caused by the prisms creates distortion when the prisms are used in imaging systems. There is a need for an apparatus that can be used in conjunction with an imaging device to provide the pan and tilt functions without requiring movement of the imaging device.

SUMMARY OF THE INVENTION

This invention provides an apparatus for providing pan and tilt capability to a stationary imaging device. The apparatus comprises a first achromatic prism doublet positioned on a first axis, a second achromatic prism doublet positioned on the first axis, and at least one motor for rotating the first and second achromatic prism doublets about the first axis whereby polychromatic electromagnetic radiation from a portion of an area of interest is directed toward an imaging device.

In another aspect, the invention provides a method of providing pan and tilt capability to a stationary imaging device. The method comprises the steps of positioning a first achromatic prism doublet on a first axis, positioning a second achromatic prism doublet on the first axis, and rotating the first and second achromatic prism doublets about the first axis whereby polychromatic electromagnetic radiation from a portion of an area of interest is directed toward an imaging device.

BRIEF DESCRIPTION OF THE DRAWINGS

FIG. 2 is a plan view of a first prism used in the assembly of FIG. 1.

FIG. 3 is a side elevation view of the prism of FIG. 2.

FIG. 4 is a plan view of a second prism used in the assembly of FIG. 1.

FIG. 5 is a side elevation view of the prism of FIG. 4.

DETAILED DESCRIPTION OF THE INVENTION

This invention accomplishes a classic pan and tilt function as would be used in a remote controlled camera or imaging application. As opposed to the normal method of pan and tilt by using a dual gimbal platform to move the entire camera, this invention accomplishes that same effect by using a pair of optical achromatically corrected prisms, rotated in opposition and in concert about a central axis to vertically and or horizontally shift the image that is captured by the camera or imaging device. Since the image may encompass the entire visible and/or infrared region, the prisms are achromatized to prevent chromatic aberrations in the final image. This invention eliminates the need for swept volume allowance in the packaging of an imaging device.

Figure 1:
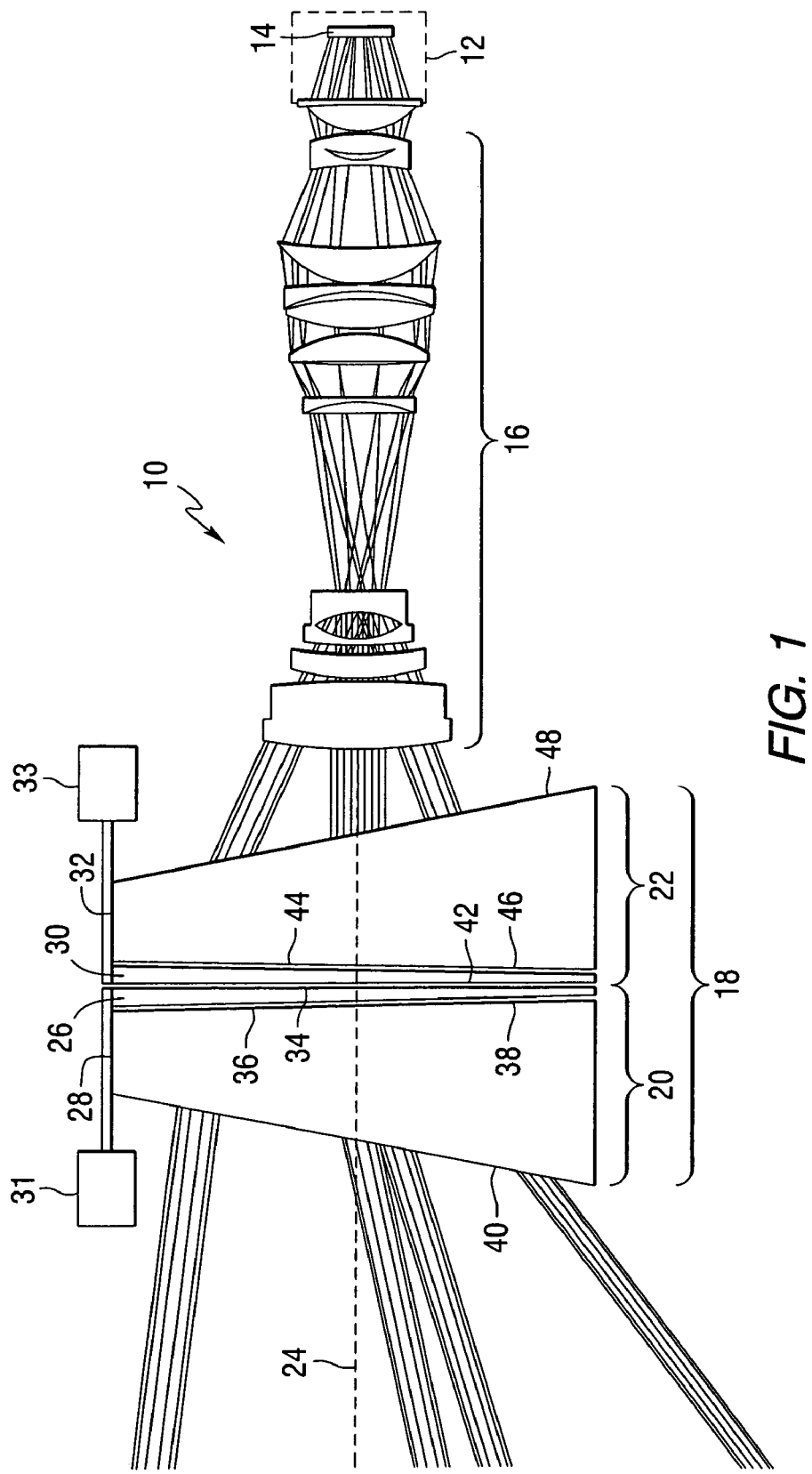
FIG. 1 is a pictorial representation of an imaging system constructed in accordance with the present invention.

FIG. 1 is a pictorial representation of an imaging system 10 constructed in accordance with the present invention. The system includes an imaging device 12, in the form of a camera. The imaging device includes an image capture element 14, such as a charge coupled device image sensor or photographic film. A telephoto lens 16 is mounted on, or adjacent to, the camera. A beam steering prism assembly 18 is positioned in front of the telephoto lens. The beam steering prism assembly includes a pair of prism doublets 20 and 22 that are mounted to be rotated about a central axis 24. Doublet 20 includes prisms 26 and 28, and doublet 22 includes prisms 30 and 32. Stepper motors 31 and 33, can be used to rotate the prism doublets.

In the first doublet 20, prism 26 includes a first surface 34 that lies in a plane that is substantially perpendicular to the axis 24. A second surface 36 of the prism 26 is inclined with respect to the axis 24. Prism 28 includes a first surface 38 that lies in a plane that is substantially parallel to the surface 36 of prism 26. A second surface 40 of the prism 28 is inclined with respect to the axis 24.

In the second doublet 22, prism 30 includes a first surface 42 that lies in a plane that is substantially perpendicular to the axis 24. A second surface 44 of the prism 30 is inclined with respect to the axis 24. Prism 32 includes a first surface 46 that lies in a plane that is substantially parallel to the surface 44 of prism 32. A second surface 48 of the prism 32 is inclined with respect to the axis 24. The prisms of each doublet are positioned adjacent to each other, but can be separated by air, optical oil, or cement.

By rotating the prism doublets, visible light and/or infrared radiation from different portions of an area of interest are directed onto the image capture element. Thus the direction of the field of view of the camera is effectively changed by rotating the prisms. This provides pan and tilt functionality without the need to move the camera. Each achromatic is rotated as a set. The doublets can be rotated independently of each other, using separate motors and motor controllers.

In cases where the desired angle from the bore sight is the same, for example 5° right and 5° left, the prisms can be rotated as a set. The doublets are preferably kept close to each other in the axial direction to minimize the overall diameter of the optical assembly.

The apparatus of FIG. 1 includes four prisms in front of a zoom lens to provide image pan and tilt. The front two prisms are rotated as a pair with respect to the rotation of the two rear prisms that are also rotated as a pair. Each pair forms an achromatic prism with the second prism of the pair correcting the color distortion caused by the first.

In the apparatus of FIG. 1 the four prisms are arranged in two prism doublets. Each doublet is a combination of two prisms of different materials and paired in opposite directions to eliminate color dispersion in polychromatic light. Each doublet is achromatic, which is "color corrected", meaning there is no rainbow effect normally associated with prisms and polychromatic light. As used herein, the phrase "paired in opposite directions" means that for a zero net angular deviation or tilt, one achromatic doublet directs the light rays in identical but opposite directions from the other achromatic doublet.

FIG. 2 is a plan view of prism 26 used in the assembly of FIG. 1. FIG. 3 is a side elevation view of the prism 26. In one embodiment, the prism is constructed of Cleartran™/Sapphire material. In FIGS. 2 and 3, prism 26 is shown to have a first surface 34 lying in plane that is substantially perpendicular to the central axis 24. That is, a first angle $\theta_1$ is substantially 90°. A second surface 36 lies in a second plane that forms a second angle $\theta_2$ with respect to the central axis. In one embodiment, the second angle is substantially 88.632°. The flat portion of the edge of the prisms provides a reference mechanical surface for angular alignment for assembly and calibration purposes.

FIG. 4 is a plan view of prism 28 used in the assembly of FIG. 1. FIG. 5 is a side elevation view of the prism 28. In one embodiment, the prism is constructed of Cleartran™/Sapphire material. In FIGS. 4 and 5, prism 28 is shown to have a first surface 38 lying in a first plane that forms a third angle $\theta_3$ with respect to the central axis 24. In one embodiment, the third angle $\theta_3$ is substantially 88.632°. A second surface 40 lies in a second plane that forms a second angle $\theta_4$ with respect to the central axis. In this embodiment, the second angle is substantially 100.624°.

The prisms of FIGS. 2–4 are mounted on a common axis, with surface 36 of prism 26 being positioned adjacent to surface 38 of prism 28 to form the doublet 20. Adjacent surfaces may be separated by air, optical oil or cement. By selecting appropriate materials and surface angles, the doublet forms an achromatic prism. Thus light of various wavelengths experiences a similar bend as it passes through the doublet.

Figure 6:
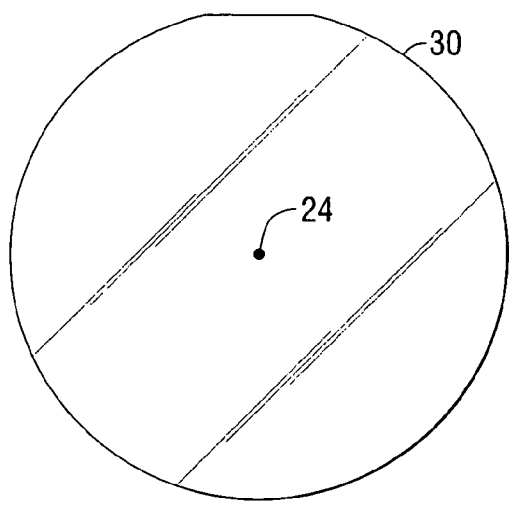
FIG. 6 is a plan view of a third prism used in the assembly of FIG. 1.
Figure 7:
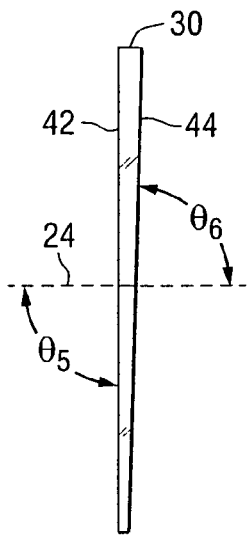
FIG. 7 is a side elevation view of the prism of FIG. 6.

FIG. 6 is a plan view of prism 30 used in the assembly of FIG. 1. FIG. 7 is a side elevation view of the prism 30. In one embodiment, the prism is constructed of Cleartran™/Sapphire material. In FIGS. 6 and 7, prism 30 is shown to have a first surface 42 lying in plane that is substantially perpendicular to the central axis 24. That is, a first angle $\theta_5$ is substantially 90°. A second surface 44 lies in a second plane that forms a second angle $\theta_6$ with respect to the central axis. In this embodiment, the second angle is substantially 88.632°.

Figure 8:
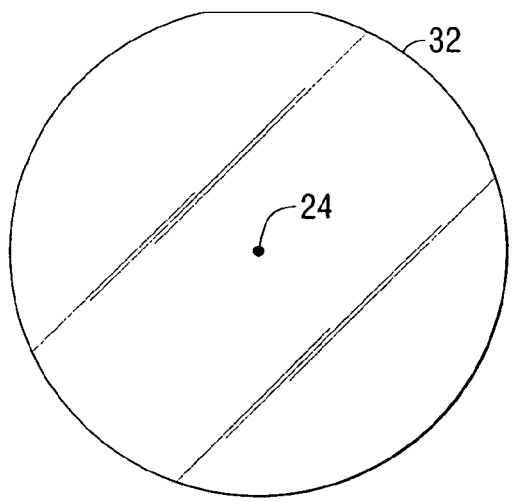
FIG. 8 is a plan view of a fourth prism used in the assembly of FIG. 1.
Figure 9:
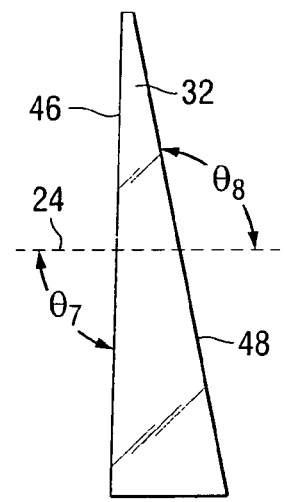
FIG. 9 is a side elevation view of the prism of FIG. 8.

FIG. 8 is a plan view of prism 32 used in the assembly of FIG. 1. FIG. 9 is a side elevation view of the prism 32. In one embodiment, the prism is constructed of Cleartran™/Sapphire material. In FIGS. 8 and 9, prism 32 is shown to have a first surface 46 lying in a first plane that forms a third angle $\theta_7$ with respect to the central axis 24. In one embodiment, the third angle $\theta_7$ is substantially 88.632°. A second surface 48 lies in a second plane that forms a second angle $\theta_8$ with respect to the central axis. In this embodiment, the second angle is substantially 100.624°.

The prisms of FIGS. 6–9 are mounted on a common axis, with surface 44 of prism 30 being positioned adjacent to surface 46 of prism 32 to form the doublet 22. By selecting appropriate materials and surface angles, the doublet forms an achromatic prism. Thus light of various wavelengths experiences a similar bend as it passes through the doublet.

Various optical material combinations have been investigated for use in a doublet prism that could be used to achromatize the color (wavelength) dispersion normally associated with prisms to provide very high quality image steering. Selection of the final materials was based on the optimization of achromatization performance, minimization of prism thickness (mass), maximization of imaging steering, and the ready availability of materials. As used herein, the phrase "maximization of imaging steering" refers to the maximum angular redirection of light from the axial direction given acceptable color distortion and physical optical axial length. Based on the results of this study, two systems were built, one covering the normal visible and near infrared (NIR) range of 0.450 to 0.850 microns, and a second covering the thermal imaging band of 8.0 to 12.0 microns. The visible and NIR band was reduced to practice by forming each doublet prism from a combination of Cleartran™ Zinc-Sulfate and Sapphire. In an example embodiment, each component of a doublet can be constructed of a single material. The thermal version used Zinc-Sulphide and Germanium. In each version, a pair of doublets was then used in an assembly, which used standard stepper motors under embedded microprocessor control to rotate the prisms about their central axis as commands from an external system. The samples were fabricated to use 100 mm diameter prisms to accommodate a wide variety of associated camera lens diameters and focal lengths. Operation and installation only requires that the camera be aimed through the prism assembly. The results were very high quality images for both systems with a pan and tilt range of 30 degrees in each axis.

Figure 10:
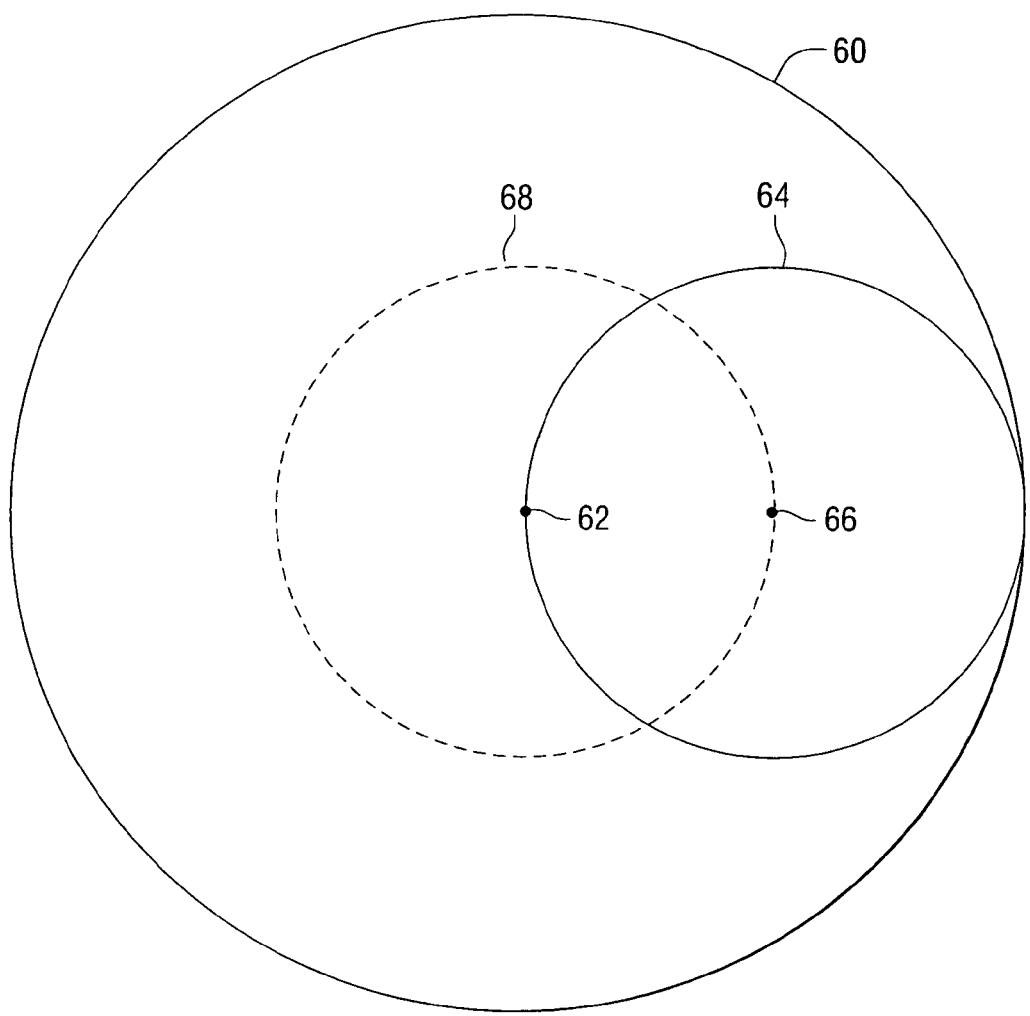
FIG. 10 is a schematic representation of an area of interest that can be imaged using the invention.

FIG. 10 is a schematic representation of an area of interest as represented by circle 60. Point 62 is the center of the area of interest. The field of view provided by the prism assembly of this invention is represented by circle 64, having a center 66. The position of the field of view can be changed by rotating the prism doublets. For example, the center of the field of view can be positioned anywhere on circle 68. Rotation of both doublets as a set would result in the center of the view rotating along circle 68. If the doublets are differentially moved, the center of the field of view can move from the neutral (centered) position 62 at any angle and distance from 62 to the extent limit defined by the circle 68.

Figure 11:
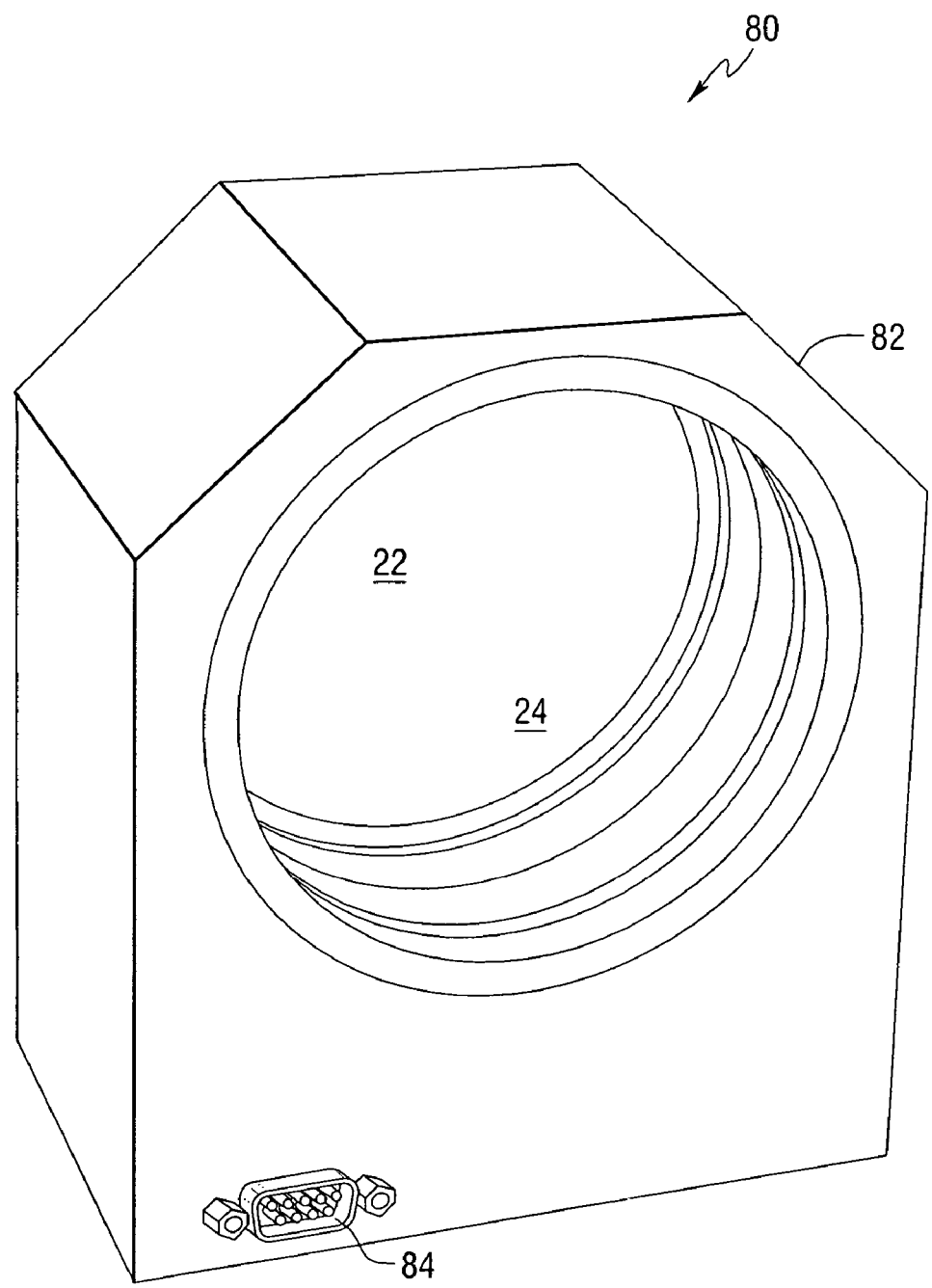
FIG. 11 is a pictorial representation of a prism assembly constructed in accordance with the invention.

FIG. 11 is a pictorial representation of an optical pan and tilt unit 80 constructed in accordance with this invention. The unit includes a housing 82 that supports two prism doublets 20 and 24. The housing contains an actuator, such as at least one stepper motor, that is used to rotate the prism doublets. The housing also contains control circuitry for controlling the operation of the motor in accordance with control signals that can be supplied through connector 84. The housing may be placed in front of any standard camera. Since each doublet must be able to move independently, two motors and positional feedback systems are used.

In this invention, each wavelength of the light that forms an image is bent by the same amount and thus the image will be shifted in direction but without the rainbow color separation normally inherent in prism bent light. While the prisms in the above embodiments were made of Cleartran™ zinc sulfide, sapphire and germanium, other optical materials can be used to construct the prisms. For example, other achromatic pairings of materials are possible such as Sapphire/SFL57, Sapphire/SF56A, Cleartran™/FK5, and other pairings. If different materials are used for the prisms, the prism thicknesses and angles of the surfaces can be adjusted to provide the required color correction.

If a normal prism is used to shift an image, various wavelengths of the image would be bent to a different degree and the resultant image would be severely distorted. The prisms used in this invention work in the reverse of Risley prisms, which are used to steer a projected light. In this invention, the prisms are used to steer the sensitive field of a camera.

While the invention has been described in terms of several embodiments, it will be apparent to those skilled in the art that various changes can be made to the disclosed embodiments without departing from the scope of the invention as set forth in the following claims.

What is claimed is:

1. An apparatus for providing pan and tilt capability to a stationary imaging device, the apparatus comprising:
   a first achromatic prism doublet positioned on a first axis including a first prism having a first surface lying in a plane substantially perpendicular to the first axis and a second surface inclined with respect to the first axis, and a second prism having a third surface lying in a plane substantially parallel to the second surface and a fourth surface inclined with respect to the first axis;
   a second achromatic prism doublet positioned on the first axis including a third prism having a fifth surface lying in a plane substantially perpendicular to the first axis and a sixth surface inclined with respect to the first axis, and a fourth prism having a seventh surface lying in a plane substantially parallel to the sixth surface and an eighth surface inclined with respect to the first axis; and
   at least one motor for rotating the first and second achromatic prism doublets about the first axis whereby polychromatic electromagnetic radiation from a portion of an area of interest is directed toward an imaging device.

2. The apparatus of claim 1, wherein:
   the first prism comprises zinc-sulfide; and
   the second prism comprises sapphire.

3. The apparatus of claim 1, wherein:
   the first prism comprises zinc-sulfide; and
   the second prism comprises germanium.

4. The apparatus of claim 1, wherein:
   the second surface is inclined at a first angle of substantially 88.6320°; and
   the fourth surface is inclined at a second angle of substantially 100.6240°.

5. The apparatus of claim 1, wherein:
   the second surface of the first prism and the third surface of the second prism are positioned adjacent to each other.

6. The apparatus of claim 1, wherein:
   the first surface of the first prism in the first doublet and the fifth surface of the third prism in the second doublet are positioned adjacent to each other.

7. The apparatus of claim 1, wherein the at least one motor rotates the first and second prism doublets in opposite directions and by equal amounts.

8. A method of providing pan and tilt capability to a stationary imaging device, the method comprising the steps of:
   positioning a first achromatic prism doublet on a first axis wherein the first achromatic prism doublet includes a first prism having a first surface lying in a plane substantially perpendicular to the first axis and a second surface inclined with respect to the first axis, and a second prism having a third surface lying in a plane substantially parallel to the second surface and a fourth surface inclined with respect to the first axis;
   positioning a second achromatic prism doublet on the first axis wherein the second achromatic prism doublet includes a third prism having a fifth surface lying in a plane substantially perpendicular to the first axis and a sixth surface inclined with respect to the first axis, and a fourth prism having a seventh surface lying in a plane substantially parallel to the sixth surface and an eighth surface inclined with respect to the first axis; and
   rotating the first and second achromatic prism doublets about the first axis whereby polychromatic electromagnetic radiation from a portion of an area of interest is directed toward an imaging device.

9. The method of claim 8, wherein:
   the first prism comprises zinc-sulfide; and
   the second prism comprises sapphire.

10. The method of claim 8, wherein:
    the first prism comprises zinc-sulfide; and
    the second prism comprises germanium.

11. The method of claim 8, wherein:
    the second surface is inclined at a first angle of substantially 88.6320°; and
    the fourth surface is inclined at a second angle of substantially 100.6240°.

12. The method of claim 8, wherein:
    the second surface of the first prism and the third surface of the second prism are positioned adjacent to each other.

13. The method of claim 8, wherein:
    the first surface of the first prism in the first doublet and the fifth surface of the third prism in the second doublet are positioned adjacent to each other.

14. The method of claim 8, wherein the first and second prism doublets are rotated in opposite directions and by equal amounts.

15. The method of claim 8, wherein the first and second prism doublets are rotated in the same direction.

16. The method of claim 8, wherein rotation of the first and second prism doublets provides a pan and tilt range of 30 degrees in each axis.

* * * * *